United States Patent
Karolak (10) Patent No.: US 12,165,000 B2
(45) Date of Patent: Dec. 10, 2024

(54) VEHICLE ITEM IDENTIFICATION AND REGISTRATION

(71) Applicant: MAGNA ELECTRONICS, LLC, Southfield, MI (US)

(72) Inventor: Paul Karolak, Brighton, MI (US)

(73) Assignee: MAGNA ELECTRONICS, LLC, Southfield, MI (US)

( * ) Notice: Subject to any disclaimer, the term of this patent is extended or adjusted under 35 U.S.C. 154(b) by 355 days.

(21) Appl. No.: 17/583,210

(22) Filed: Jan. 25, 2022

(65) Prior Publication Data

US 2023/0237293 A1    Jul. 27, 2023

(51) Int. Cl.
*G06K 7/14* (2006.01)
*G06Q 20/20* (2012.01)

(52) U.S. Cl.
CPC ......... *G06K 7/1443* (2013.01); *G06K 7/1413* (2013.01); *G06Q 20/208* (2013.01)

(58) Field of Classification Search
CPC ... G06K 7/1433; G06K 7/1413; G06Q 20/208
See application file for complete search history.

(56) References Cited

U.S. PATENT DOCUMENTS

| | | | | |
|---|---|---|---|---|
| 7,467,380 B2* | 12/2008 | Kurlander | ............... | G06F 3/038 |
| | | | | 345/173 |
| 8,831,677 B2* | 9/2014 | Villa-Real | ............... | H04M 1/66 |
| | | | | 455/552.1 |
| 9,911,023 B2* | 3/2018 | Germaine | .......... | G06K 7/10722 |
| 10,303,961 B1* | 5/2019 | Stoffel | .................... | H04W 4/44 |
| 10,311,704 B1* | 6/2019 | Xu | .......... | G08B 21/24 |
| 10,839,668 B2* | 11/2020 | Tezuka | ................... | G08B 29/02 |
| 11,972,268 B2* | 4/2024 | Lee | ....................... | G06F 9/4411 |

* cited by examiner

*Primary Examiner* — Gregory M Desire (57) ABSTRACT

An apparatus comprises an image sensor and a processor circuit. The image sensor may be configured to capture images of a field of view of the image sensor. The processor circuit may be configured to (i) receive the images captured by the image sensor and (ii) generate one or more control signals in response to objects in the images. The processor circuit may be further configured to (i) detect a registration indicia on an object in one or more of the images, (ii) determine whether the processor circuit includes support for the object associated with the registration indicia, and (iii) when the processor circuit does not include support for the object associated with the registration indicia, download support information for the object associated with the registration indicia from a database.

20 Claims, 9 Drawing Sheets

VEHICLE ITEM IDENTIFICATION AND REGISTRATION

FIELD OF THE INVENTION

The invention relates to computer vision generally and, more particularly, to a method and/or apparatus for implementing vehicle item identification and registration.

BACKGROUND

Modern vehicles utilize in-cabin monitoring to recognize when people and objects are present inside the vehicles. Application can include using interior sensors to detect the presence of child safety products such as car seats, as well as other objects. There are numerous models and styles of car seats available in the market. Enabling vehicles to recognize every model and style of products used in vehicles would be expensive and difficult.

It would be desirable to implement a method and/or apparatus for vehicle item identification and registration.

SUMMARY

The invention concerns an apparatus comprising an image sensor and a processor circuit. The image sensor may be configured to capture images of a field of view of the image sensor. The processor circuit may be configured to (i) receive the images captured by the image sensor and (ii) generate one or more control signals in response to objects in the images. The processor circuit may be further configured to (i) detect a registration indicia on an object in one or more of the images, (ii) determine whether the processor circuit includes support for the object associated with the registration indicia, and (iii) when the processor circuit does not include support for the object associated with the registration indicia, download support information for the object associated with the registration indicia from a database.

BRIEF DESCRIPTION OF THE FIGURES

Embodiments of the invention will be apparent from the following detailed description and the appended claims and drawings.

DETAILED DESCRIPTION OF THE EMBODIMENTS

Embodiments of the present invention include providing a method and/or apparatus for vehicle item identification and registration that may (i) give owners, users, and suppliers of vehicles a way to register and track items within the vehicle via a vehicle sensor suite, (ii) detect the entering, exiting, and usage of physical items in a vehicle by recognizing an indicia applied to specific items, (iii) allow a vehicle system upon detecting the indicia to access (or download) data/information/software related to the specific items, (iv) allow manufacturers and/or suppliers to collect real world data about product usage, (v) enable vehicle systems to identify and/or store information for a specific product (e.g., a car seat design, etc.), (vi) facilitate adding additional sensors to a vehicle, (vii) facilitate updating a vehicle system with features related to added sensors, and/or (viii) be implemented as one or more integrated circuits.

Figure 1:
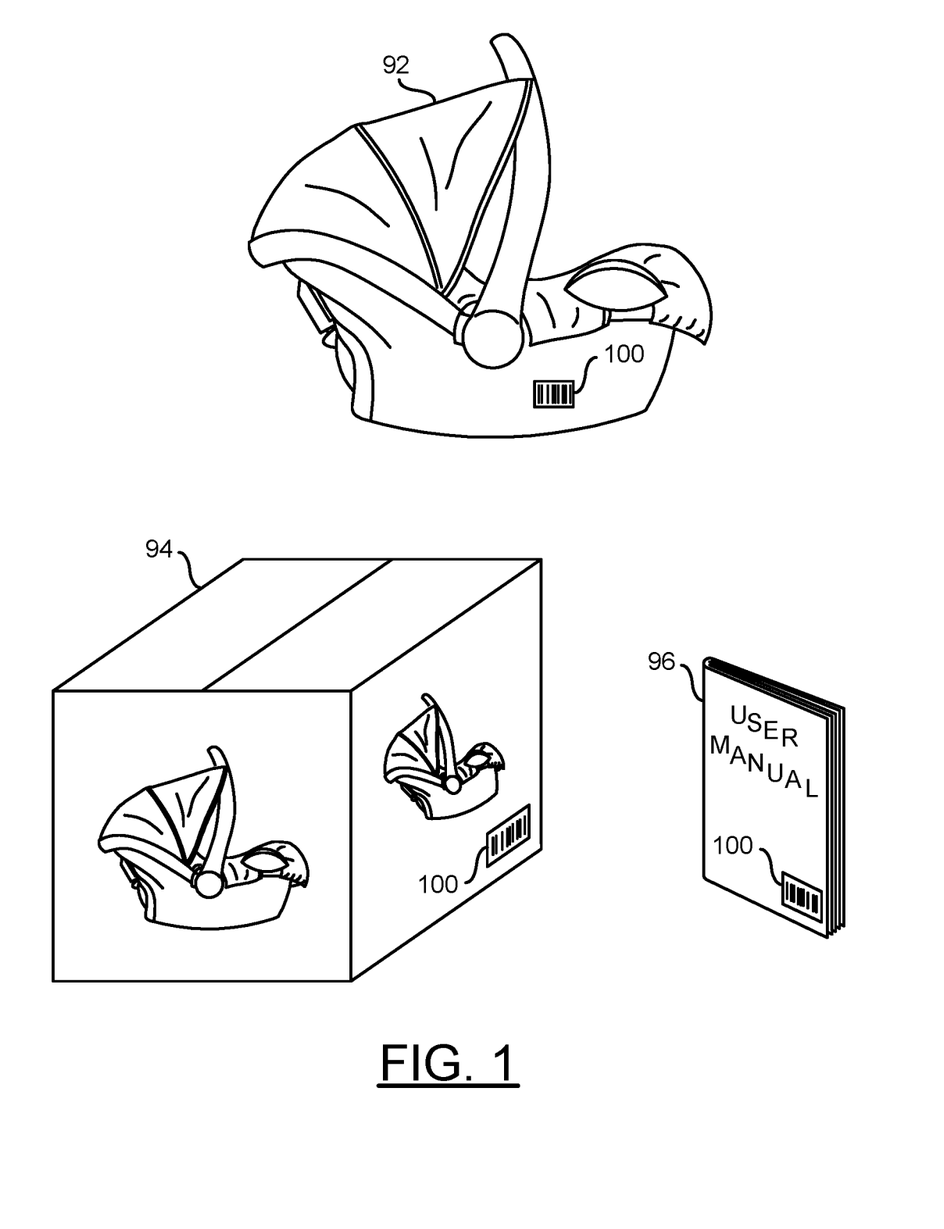
FIG. 1 is a diagram illustrating example applications of an indicia in accordance with an embodiment of the invention.

Referring to FIG. 1, a diagram is shown illustrating example applications of an indicia in accordance with an embodiment of the invention. In an example, an item to be added to, or used in, a vehicle may comprise a child car seat 92. In an example, the car seat 92 may be limited as to which vehicles the car seat may be installed. When a consumer is shopping for the car seat 92, the car seat 92 is generally found packaged in a box 94. The box 94 may include information about the vehicles in which the car seat 92 may be installed, as well as other important information about proper application of the car seat 92. Inside the box 94, a user/instruction manual 96 may also be found. In various embodiments, an indicia (or label or decal) 100 may be provided that may be configured to identify the car seat 92 and enable information about the car seat 92 to be obtained (e.g., from a database, etc.). In various embodiments, the indicia 100 may be placed (or printed or stamped) on the car seat 92, the packaging 94, and/or the user/instruction manual 96. In an example, a consumer may research items for their vehicle and obtain a list of item certification codes that are compatible. The consumer may then use the list and indicia on the products to make purchasing decisions.

In an example, the indicia 100 may be implemented as a machine readable indicia (e.g. QR Code, barcode, etc.). In an example, the indicia 100 may be attached to items to be placed within a vehicle. In an example, the indicia 100 may be configured to be detected upon entering, exiting, and/or being used in the vehicle. In an example, the vehicle may be configured to identify the physical items by detecting and recognizing the indicia. Once detected, the vehicle may be configured to access (or download) data/information/software related to the specific item identified.

In an example, a vehicle may identify a specific car seat design being installed. The vehicle may then download and store information for the specific car seat design. In an example, the vehicle may download installation instructions to guide the owner in properly installing the car seat. In an example, the vehicle may download information to facilitate recognizing the item in various conditions of use, including when partially obscured from vehicle sensors. In an example, the indicia 100 may be utilized in a process for updating the vehicle system with features related to the added item(s). In an example, the indicia 100 may be utilized to download (or otherwise obtain) information to potentially shortcut machine learning (ML), possibly taking advantage of ML bias. In an example, a vehicle does not need to store all features/applications/data of each item that may be used in the vehicle. Instead, the vehicle my limit features/applications/data being stored and update on demand.

Figure 2:
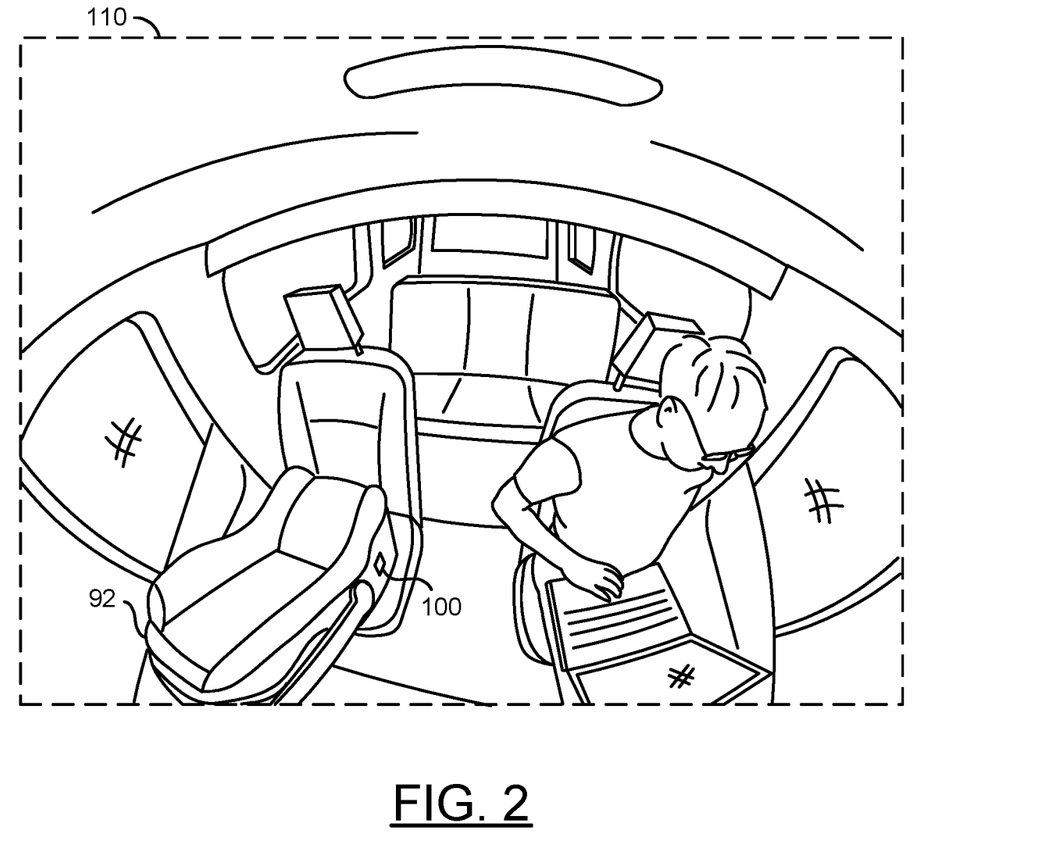
FIG. 2 is a diagram illustrating a marked item within a cabin of a vehicle.

Referring to FIG. 2, a diagram is shown illustrating a marked item within a cabin of a vehicle. A picture 110 is shown illustrating a view within a cockpit (or cabin or passenger compartment) of a vehicle from the perspective of an in-cabin monitoring system. In an example, a user may install the car seat 92 in a middle seat of the vehicle. The indicia 100 may be placed on the car seat 92 such that the in-cabin monitoring system can image and recognize the indicia 100. Upon recognizing the indicia 100, the vehicle may obtain (e.g., download) information for (i) recognizing the car seat 92, (ii) recognizing when the car seat 92 is empty, (iii) recognizing when a person or some other object is in the car seat, (iv) recognizing the car seat even when partially obscured from view (e.g., by another seat, a blanket, or some other obstacle). In an example, when the vehicle no longer detects the presence of the indicia, the vehicle may make storage used to store information about the car seat 92 available for other applications.

Figure 3:
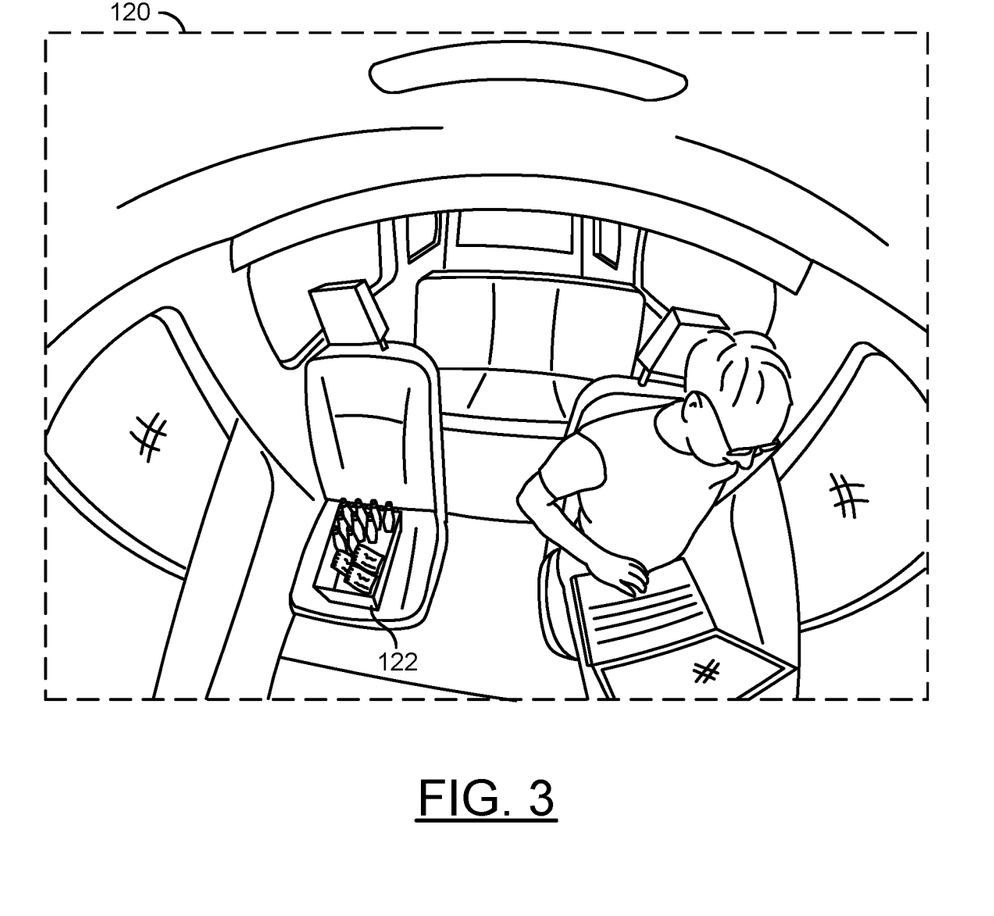
FIG. 3 is a diagram illustrating a collection of marked items within a cabin of a vehicle.

Referring to FIG. 3, a diagram is shown illustrating a collection of marked items within a cabin of a vehicle. A picture 120 is shown illustrating a view within a cockpit (or cabin or passenger compartment) of a vehicle from the perspective of an in-cabin monitoring system. In an example, a user or vehicle owner may install a collection of items 122 in a middle seat of the vehicle. The collection of items 122 may also be stored in other locations in the interior of the vehicle (e.g., between the seats, etc.). The collection of items 122 may comprise items to be sold to passengers of the vehicle (e.g., in a robo-taxi). Each of the items in the collection may have a respective indicia 100 such that the in-cabin monitoring system may image and recognize the type and location of each item. Upon recognizing the respective indicia 100, the vehicle may obtain (e.g., download) information for (i) recognizing the items in the collection of items 122, (ii) recognizing when the collection of items 122 is empty, (iii) recognizing when an item is removed from the collection of items 122. In an example, a human machine interface of the vehicle may be used by passengers to make purchases of the items in the collection of items 122.

Figure 4:
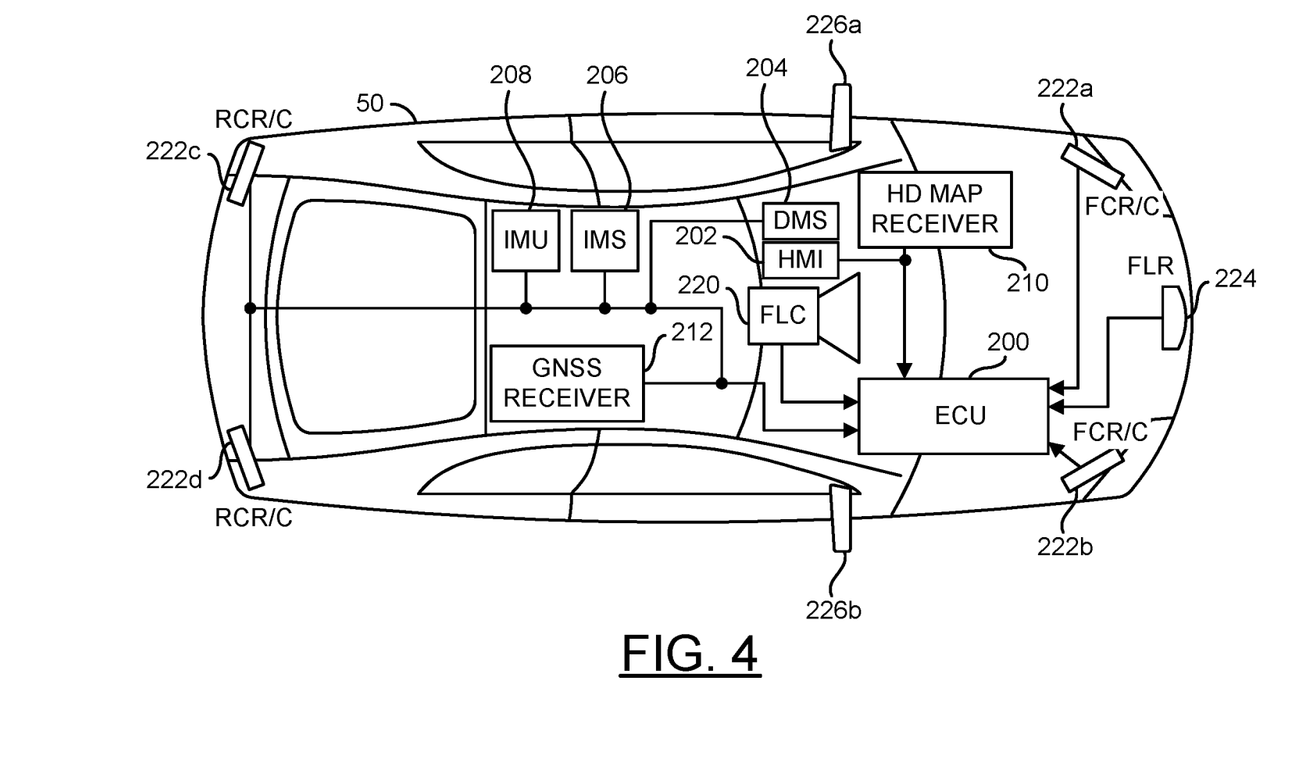
FIG. 4 is a diagram illustrating a sensor suite and electronic control unit (ECU) of a vehicle in which vehicle item identification and registration in accordance with an example embodiment of the present invention may be implemented.

Referring to FIG. 4, a diagram is shown illustrating systems of a vehicle in which vehicle item identification and registration in accordance with an example embodiment of the invention may be implemented. In an example, a vehicle system may comprise a suite of sensors and an electronic control unit (ECU) 200. In an example, the electronic control unit (ECU) 200 may be mounted totally within, or at least partially within a vehicle 50. In various embodiments, the vehicle item identification and registration in accordance with an example embodiment of the present invention may be implemented within the ECU 200 of the vehicle 50. The ECU 200 may be connected to a vehicle platform of the vehicle 50. In an example, the vehicle 50 may include a human machine interface (HMI) 202, a driver monitoring system (DMS) 204, an in-cabin monitoring system (IMS) 206, an inertial measurement unit (IMU) 208, a high-definition (HD) map receiver 210, a global navigation satellite system (GNSS) receiver 212, a forward looking camera (FLC) 220, a number of corner radar/camera sensors (FCR/Cs) 222a-222d, a forward looking radar (FLR) sensor 224, and a number of side radar/camera sensors 226a-226b.

In some embodiments, the vehicle 50 may also include LIDAR sensors and/or sonar sensors (not shown).

The forward looking camera (FLC) 220 is generally used to detect and identify objects and road features in front of the vehicle 50. In an example, the forward looking camera (FLC) 220 may be configured to provide stereoscopic vision with a 100-degree field of view (FOV). In an example, the forward looking camera (FLC) 220 may be used to detect road markings (e.g., lane markings, etc.), road signs, traffic lights, structures, etc. The corner radar sensors 222a-222d and the forward looking radar (FLR) sensor 224 (and LIDAR and/or sonar sensors when present) are generally used to detect and track objects. In an example, each of the corner radar sensors 222a-222d may have a 140-degree FOV. In an example, the forward looking radar sensor (FLR) 224 may have two FOVs, an 18-degree FOV for long-range sensing and a 90-degree FOV for short range sensing. The IMU 208 generally reports the orientation, angular velocity and acceleration, and forces acting on the vehicle 50.

In an example, the HMI 202, the DMS 204, the IMS 206, the IMU 208, the HD map receiver 210, the GNSS receiver 212, the FLC 220, the FCR/Cs 222a-222b, the FLR 224, and the side cameras/radars 226a-226b may be connected to the ECU 200. In an example, the HMI 202, the DMS 204, the IMS 206, the IMU 208, the HD map receiver 210, the GNSS receiver 212, the FLC 220, the FCR/Cs 222a-222b, the FLR 224, and the side cameras/radars 226a-226b may be connected to the ECU 200 via one or more vehicle buses of the vehicle 50. In another example, the HMI 202, the DMS 204, the IMS 206, the IMU 208, the HD map receiver 210, the GNSS receiver 212, the FLC 220, the FCR/Cs 222a-222b, the FLR 224, and the side cameras/radars 226a-226b may be connected to the ECU 200 via a wireless protocol.

In an example, the HMI 202 may convey information from the ECU 200 to the occupants and from the occupants to the ECU 200. In an example, the DMS 204 may convey driver attentiveness information to the ECU 200. In an example, the IMS 206 may convey information about passengers and objects within the cabin of the vehicle 50 to the ECU 200. The IMS 206 may employ cameras and other sensors (e.g., radar, thermal, acoustic, etc.) to monitor the interior of the vehicle 50. The FLC 220 may convey surrounding road information (e.g., lane widths, marker types, lane marker crossing indications, and video) to the ECU 200. The GNSS receiver 212 may convey position data (e.g., latitude value, longitude value, adjustment information and confidence information) to the ECU 200. The HD map receiver 210 may transfer map data to the ECU 200.

The FLC 220 may implement an optical sensor. In various embodiments, the FLC 220 may be an optical camera. The FLC 220 is generally operational to provide the surrounding road information (or image data) to the ECU 200. The road information may include, but is not limited to, lane width data, marker type data, lane change indicators, and video of a roadway ahead of the vehicle 50 within the field of view of the FLC 220. In various embodiments, the FLC 220 may be a color camera. The color may be useful for distinguishing between solid-yellow lane markers (e.g., leftmost lane markers) from solid-white lane markers (e.g., rightmost lane markers). In various embodiments, the FLC 220 may provide an estimated lane width for at least a current lane in the center of the field of view of the FLC 220. In some embodiments, the FLC 220 may provide estimated lane widths for the lane(s) neighboring the center lane. In other embodiments, the FLC 220 may provide estimated lane widths for all of the lanes within the field of view of the FLC 220. The lane widths may be determined using standard image recognition methods and standard analysis methods implemented in the FLC 220. The FLC 220 may also identify all lane markers within the field of view of the FLC 220. When the FLC 220 crosses over a lane marker, the FLC 220 may notify the ECU 200 that a lane change is occurring. Identification of the lane markers and the lane changes may be determined using standard image recognition methods and standard analysis methods implemented in the FLC 220. The FLC 220 may transfer the road information to the ECU 200 via a vehicle bus or a wireless protocol.

One or more other types of sensors may be used in conjunction with the FLC 220. Example sensors may include, but are not limited to, radar sensors, light detection and ranging (LiDAR) sensors, inertial sensors, thermal imaging sensors, and/or acoustic sensors. Some of the sensors may detect objects on the side of the road to provide estimations of a left boundary and a right boundary of the road. From the left boundary and the right boundary, a width of the road may be calculated. From the calculated width, an estimation of how many lanes probably fit within the width may be made based on a standard lane width. Thereafter, the sensors may estimate the current lane that the vehicle 50 occupies based on the relative distances of the sensors on the vehicle 50 to the left boundary and the right boundary of the road and the estimated number of lanes. Lane crossovers may be determined by the sensors based on the estimated numbers of lanes and changes in the relative distances to the left boundary and/or the right boundary.

In an example, the ECU 200 may implement a control circuit. In an example, the ECU 200 may be operational to keep track of the current lane that the vehicle 50 occupies and correct the current position of the vehicle 50 to a center of the current lane. The tracking may be based on the satellite position data received in the GNSS receiver 212, the map data received from the HD map receiver 210, and the road information received in the vision detections from the FLC 220 and the radar detections received from the FCRs 222a-222b, and the FLR 224. The satellite position data may include an adjustment value and a corresponding confidence value.

The GNSS receiver 212 may implement a satellite-navigation device. In various embodiments, the GNSS receiver 232 may include a Global Positioning System (GPS) receiver. Other types of satellite-navigation devices may be implemented to meet the design criteria of a particular application. The GNSS receiver 212 is generally operational to provide the latitude data and the longitude data of the vehicle 50 based on the GNSS signals received from a number of satellites. The GNSS receiver 212 may also be operational to adjust the latitude data and the longitude data based on the adjustment value and a corresponding confidence value received from the ECU 200. The confidence value may have a range from zero (e.g., unreliable) to one (e.g., reliable). If the confidence value is above a high threshold (e.g., >0.7), the GNSS receiver 212 may correct the latitude data and the longitude data per the adjustment value. If the confidence value is below a low threshold (e.g., <0.3), the GNSS receiver 212 may ignore the adjustment value. If the confidence value is between the high threshold and the low threshold, the GNSS receiver 212 may apply a correction to both the latitude data and the longitude data that is a linear weighting based on the degree of confidence.

The HD map receiver 210 may implement a radio-frequency receiver. The HD map receiver 210 may be operational to receive map data from an antenna (not shown). The map data may be converted to a digital form and presented to the ECU 200.

Figure 5:
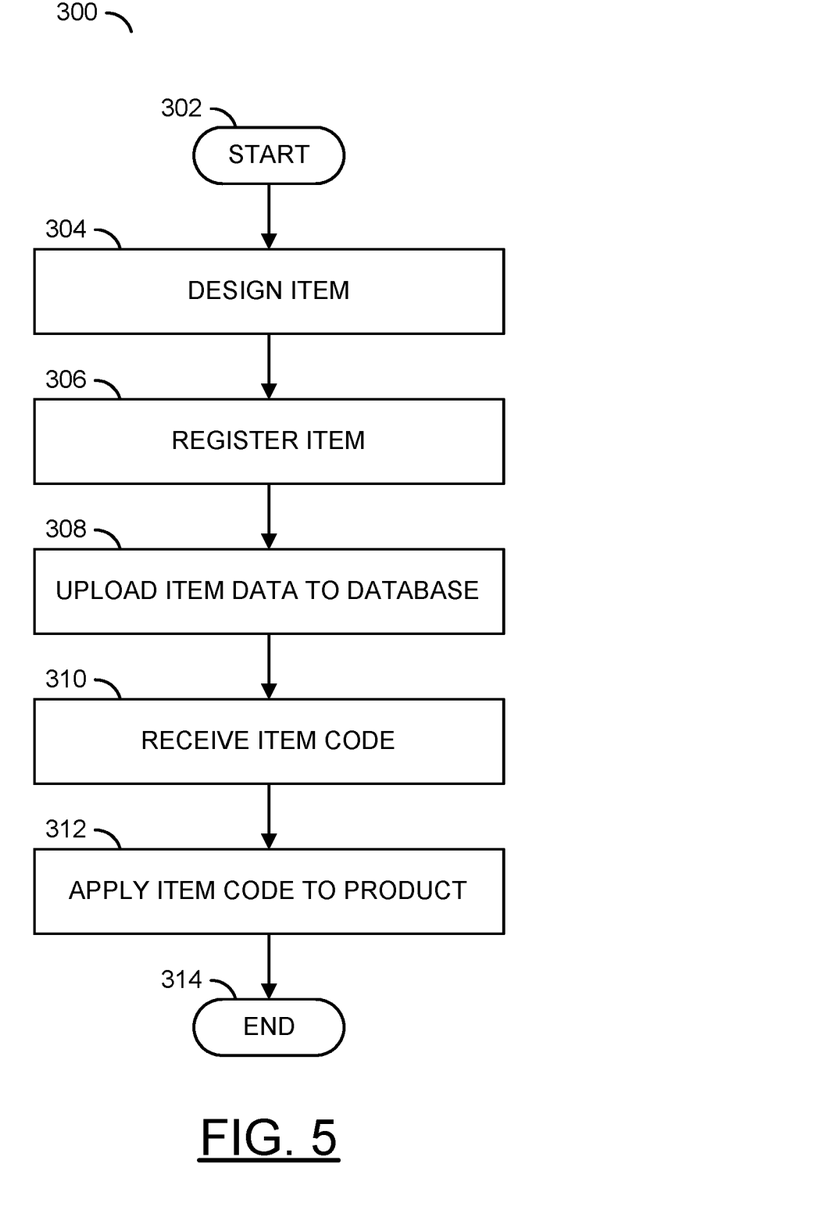
FIG. 5 is a flow diagram illustrating a process in accordance with an example embodiment of the present invention.

Referring to FIG. 5, a flow diagram is shown illustrating a process in accordance with an example embodiment of the present invention. A method (or process) 300 may be implemented by a manufacturer or supplier to obtain a certification indicia in accordance with an example embodiment of the invention. In an example, the method 300 may comprise a step (or state) 302, a step (or state) 304, a step (or state) 306, a step (or state) 308, a step (or state) 310, a step (or state) 312, and a step (or state) 314. The method 300 may begin in the step 302 and move to the step 304.

In the step 304, the manufacturer or supplier may design a particular item (e.g., car seat, sensor device, item for sale, etc.) to be used in a vehicle. In an example, the design may include specifications for installation and safe usage of items related to safety such as car seats, booster seats, etc. In an example, the manufacturer or supplier may generate information for facilitating identification and recognition of the item in various states (or conditions) and in various vehicles. In an example, the information may include, but is not limited to, training image sets, meta data for supporting machine learning and/or neural network operations, etc. In an example, training image sets may be provided containing images of the items in various conditions (e.g., different portions of the items obscured, etc.), images from various angles/orientations, images of various models, images using various sensors, etc. In an example, annotated images may be provided, which include tags identify what the machine learning is to detect from each image. For example, lines of the images may be replaced with embedded meta data identifying the desired response. For example, the information provided by the manufacture or supplier generally provides the ground truth information for training various machine learning and/or neural network based algorithms. When the design is complete, the method 300 may move to the step 306.

In the step 306, the manufacturer or supplier may register the item. In an example, registration may associate the item with a unique indicia 100. In an example, registration may also allow item data or information provided by the manufacturer or supplier to be stored in a data structure. In an example, the unique indicia 100 may be used as an index into a database containing the item data for a plurality of items. When the item has been registered, the method 300 may move to the step 308.

In the step 308, the manufacturer or supplier may be enabled to upload the item data created by the manufacturer or supplier into the database (or other data structure). In an example, the item data may include, but is not limited to, the training image sets, item descriptions, item features, installation instructions, usage recommendations, etc. The method may then move to the step 310.

In the step 310, the manufacturer or supplier may receive an item code or insignia 100 uniquely associated with the item registered. The item code or insignia may be utilized by users to reliably locate and retrieve the item data for the registered item from the database or data structure. When the manufacturer or supplier has received the item code or insignia 100, the method 300 may move to the step 312.

In the step 312, the manufacturer or supplier may apply (associate) the item code to the item that was registered. In various embodiments, the item code or indicia 100 may be placed (or printed or stamped) on the registered item (e.g. the car seat 92, etc.), on the packaging 94 of the registered item, and/or on or in the user/instruction manual 96 of the registered item. When the registered item and/or related materials have been marked with the item code or insignia 100, the method 300 may move to the step 314 and terminate.

Figure 6:
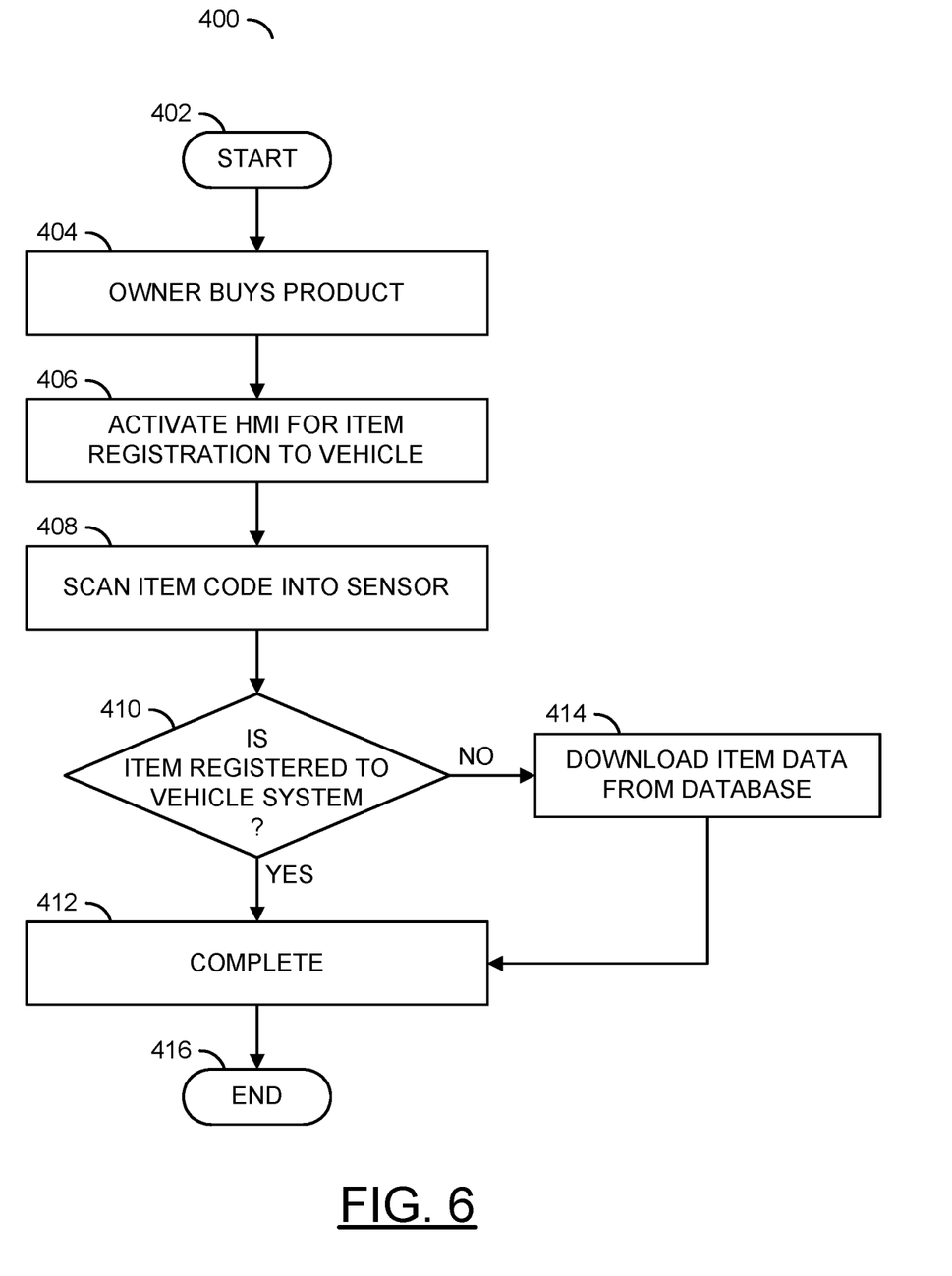
FIG. 6 is a flow diagram illustrating a process in accordance with an example embodiment of the present invention.

Referring to FIG. 6, a flow diagram is shown illustrating a process in accordance with an example embodiment of the present invention. In an example, a method (or process) 400 may be implemented by a vehicle owner to utilize a certification indicia in accordance with an example embodiment of the invention. In an example, the method 400 may be implemented to introduce the certified item to a vehicle. In an example, the method 400 may comprise a step (or state) 402, a step (or state) 404, a step (or state) 406, a step (or state) 408, a decision step (or state) 410, a step (or state) 412, a step (or state) 414, and a step (or state) 416. The method 400 may begin in the step 402 and move to the step 404.

In the step 404, the vehicle owner may purchase a product to be used in the vehicle. In an example, the purchase decision may be driven by the product having been certified for use with the vehicle. In an example, the product may have been certified using the method as described above in connection with FIG. 5. In an example, the vehicle user manual or an information site for the vehicle may contain information about which certification(s) indicate compatibility with the vehicle and/or the sensor suite of the vehicle. When the vehicle owner has purchased (or otherwise obtained) the product, the method 400 may move to the step 406.

In the step 406, the owner may introduce the product to a control system of the vehicle. In an example, the owner may activate the human machine interface (HMI) 202 of the vehicle in order to register the product (or item) to the vehicle. In an example, the HMI may present a keypad or keyboard enabling the owner to enter the certification code. In another example, the owner may show the certification code or insignia 100 to a camera associated with the HMI 202, the DMS 204, or the IMS 206 of the vehicle in order to allow the vehicle to capture an image of the item code or certification insignia 100 of the certified product being installed. In still another example, the owner may utilize other sensors of the vehicle (e.g., external cameras, radio frequency identification, etc.) to allow the vehicle to identify the item being installed.

In the step 408, the particular sensor of the vehicle being used to identify the item or product may input an image of the code or insignia 100 of the product or scan the code or insignia 100 of the product. In the decision step 410, the method 400 may determine whether the item (or product) is already known (registered) in the vehicle system. When the product is already registered in the vehicle system, the method 400 may move to the step 412. When the product is not already registered in the vehicle system, the method 400 may move to the step 414.

In the step 412, the method 400 may complete a process of setting up the systems of the vehicle for the product. In the step 414, the method 400 may download item data from a database or other data structure to the systems of the vehicle. The method 400 may then move to the step 412 to complete the process of setting up the systems of the vehicle for the product. When the vehicle systems have been set up for the product, the method 400 may move to the step 416 and terminate.

Figure 7:
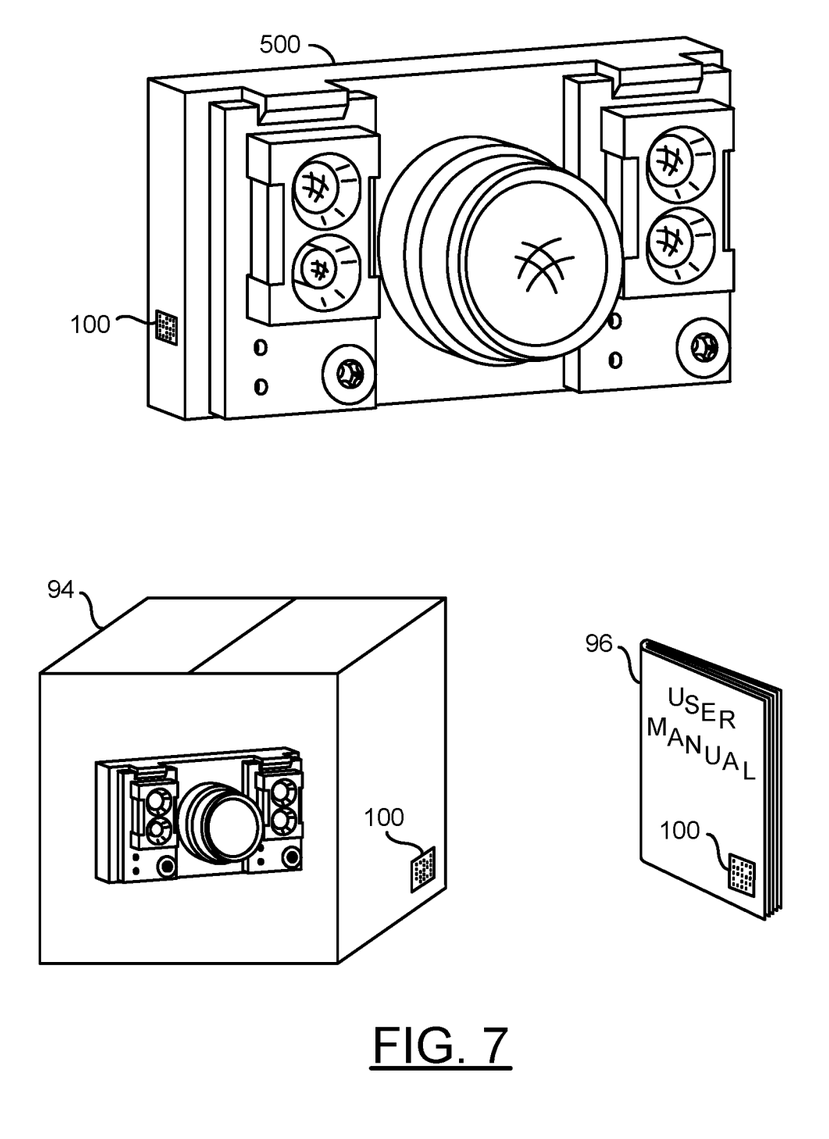
FIG. 7 is a diagram illustrating example applications of an indicia in accordance with an embodiment of the invention.

Referring to FIG. 7, a diagram is shown illustrating another example application of an indicia in accordance with an embodiment of the invention. In an example, an item to be added to a vehicle may comprise a sensor device 500. In an example, the sensor device 500 may be limited as to which vehicles the sensor device 500 may be installed within. When a consumer is shopping for the sensor device 500, the sensor device 500 may be found packaged in a box 94. The box 94 may include information about the vehicles in which the sensor device 500 may be installed, as well as other important information about proper application of the sensor device 500. Inside the box 94, a user/instruction manual 96 may also be found. In various embodiments, the indicia (or label or decal) 100 may be provided that may be configured to identify the sensor device 500 and enable information about the sensor device 500 to be obtained (e.g., from a database, etc.). In various embodiments, the indicia 100 may be placed (or printed or stamped) on the sensor device 500, the packaging 94, and/or the user/instruction manual 96.

In an example, the indicia 100 may be implemented as a machine readable indicia (e.g. QR Code, barcode, etc.). In an example, the indicia 100 may be attached to items to be placed within a vehicle. In an example, the indicia 100 may be configured to be detected upon entering, exiting, and/or being used in the vehicle. In an example, the vehicle may be configured to identify the physical items by recognizing (or otherwise using) the indicia 100. When the indicia 100 is detected, the vehicle may be configured to access (or download) data/information/software related to the specific item identified.

In an example, a vehicle may identify a specific sensor design being installed. The vehicle may then download and store information for the specific sensor design. In an example, the vehicle may download installation instructions to guide the owner (or a technician, etc.) in properly installing the sensor. In an example, the vehicle may download information to facilitate integrating the sensor 500 into the vehicle systems. In an example, the indicia 100 may be utilized in a process for updating the vehicle system with features related to the added sensor(s). In an example, the indicia 100 may be utilized to download (or otherwise obtain) information to potentially shortcut machine learning (ML), possibly taking advantage of ML bias. In an example, a vehicle does not need to store all features/applications/data of each item that may be used in the vehicle. Instead, the vehicle my limit features/applications/data being stored and update on demand.

Figure 8:
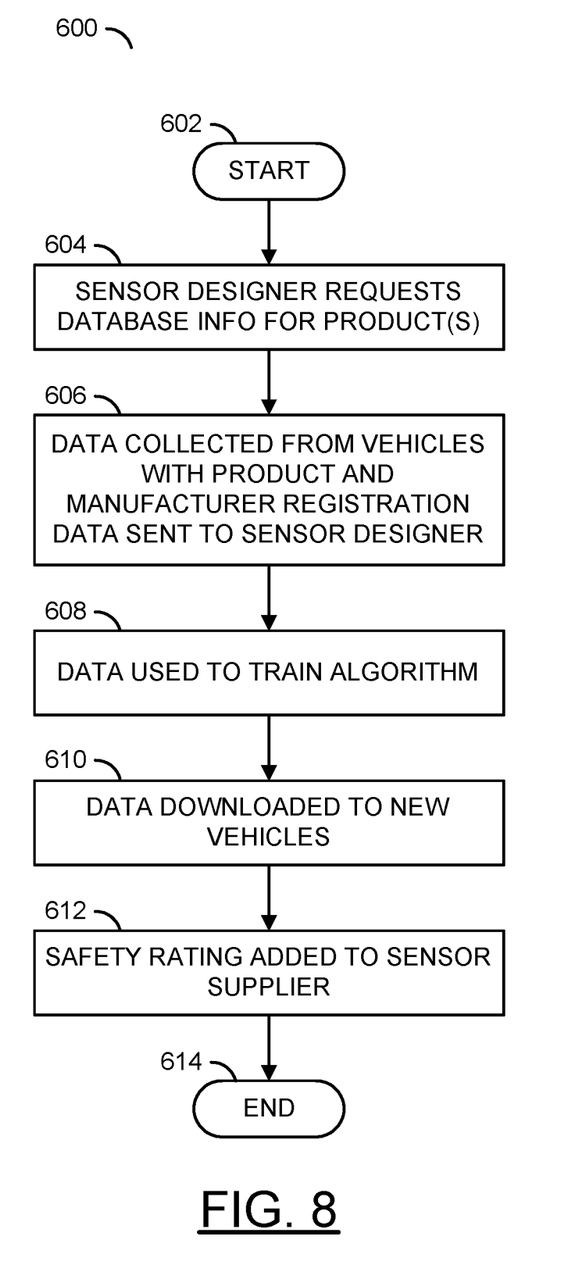
FIG. 8 is a flow diagram illustrating a process in accordance with an example embodiment of the present invention.

Referring to FIG. 8, a flow diagram is shown illustrating a process in accordance with an example embodiment of the present invention. In an example, a method (or process) 600 may be used by sensor designers, manufacturers, or suppliers to obtain or enhance a safety rating for a particular sensor or sensors. In an example, the method 600 may comprise a step (or state) 602, a step (or state) 604, a step (or state) 606, a step (or state) 608, a step (or state) 610, a step (or state) 612, and a step (or state) 614. The method 600 may begin in the step 602 and move to the step 604.

In the step 604, the sensor designer may request database information for a particular item or items (e.g., car seat, item for sale, etc.) used in vehicles. In the step 606, the sensor designer may obtain data collected from vehicles with the product or products. The sensor designer may also obtain the manufacturer or supplier registration data. In the step 608, the sensor designer may utilize the database information, the data collected from the vehicles with the product or products, and the manufacturer or supplier registration data during a training process to train one or more computer vision algorithms used by the sensor(s) for recognizing the product or products such as car seats, booster seats, items for sale, etc. In the step 610, data generated by the training process and/or the trained one or more computer vision algorithms may be downloaded to new vehicles (e.g., directly or indirectly via a database or other data structure).

In the step 612, a safety rating or compliance rating may be added to the sensor manufacture or supplier to reflect the updated capabilities of the sensor(s). The method 600 may then move to the step 614 and terminate.

In an example, the rating added to the sensor manufacture or supplier may be related to specific safety standards such as ANSI, ISO, etc. In another example, the rating may relate to compliance with particular laws, regulations, etc. In another example, the rating may relate to opinions (e.g., a five star rating, etc.) of reviewers or testing agencies (e.g., NHTSA, etc.) that encompasses a number of safety items. In another example, the rating may indicate that addition of the sensor from the sensor manufacture or supplier to a vehicle may give the vehicle certain capabilities (e.g., allow the vehicle to automatically detect installation of registered safety items, allow the vehicle to detect improper use of a safety item such as a car seat, etc.). In another example, the rating may indicate that addition of the sensor to a vehicle may allow the vehicle to inform a user of a history of a safety item being installed (e.g., detect whether a car seat being installed was previously involved in an accident, detect whether a car seat being installed has been recalled, etc.).

In another example, the rating may indicate that addition of the sensor to a vehicle may allow the vehicle to inform a user whether a safety item is being properly installed for a current use. For example, the sensor may allow the vehicle to detect whether a car seat installed in the vehicle is facing in the right direction for a particular age or size of a child in the seat, etc.). In another example, a rating may be used to indicate that particular software from the sensor manufacturer or supplier is capable of combining (or fusing) information from various in-cabin monitoring sensors such as cameras, radar, weight sensors, etc. to determined characteristics of occupants and provide a warning or adjust safety features of the vehicle accordingly. For example, the software may warn a driver when a registered car seat is not properly installed, warn the driver when a child is left in the vehicle unattended, suppress a child left in vehicle warning when a lone occupant is not a child, etc.

Figure 9:
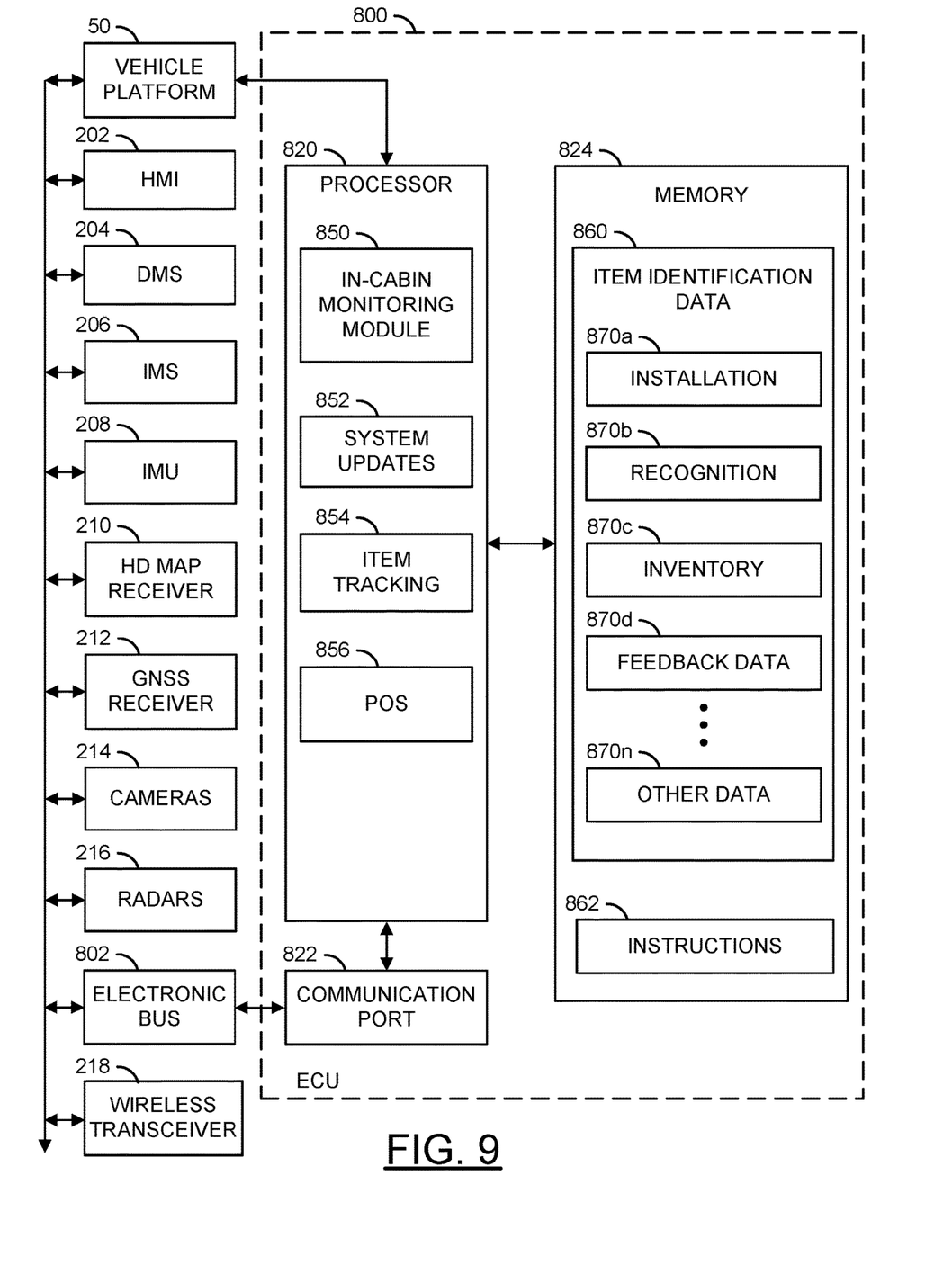
FIG. 9 is a diagram illustrating an electronic control unit implementing vehicle item identification and registration in accordance with an example embodiment of the invention.

Referring to FIG. 9, a diagram is shown illustrating an electronic control unit implementing vehicle item identification and registration in accordance with an example embodiment of the invention. In an example, an apparatus 800 may implement an electronic control unit or module (ECU). In an example, the electronic control module (ECU) 800 may be implemented as a domain controller (DC). In another example, the ECU 800 may be implemented as an active safety domain master (ASDM). In various embodiments, the ECU 800 may be configured to control activation of one or more features (or functions) of an ADAS component of a vehicle. In various embodiments, vehicle item identification and registration in accordance with an example embodiment of the invention may be implemented within the ECU 800.

In an example, the ECU 800 may be connected to a vehicle platform of the vehicle 50, the human machine interface (HMI) 202, the driver monitoring system (DMS) 204, the in-cabin monitoring system 206, the inertial measurement unit 208, the HD map receiver 210, the GNSS receiver 212, cameras 214, radars 216, a wireless communication transceiver 218, and an electronic bus 802 of the vehicle. In an example, the cameras 214 may comprise the forward looking camera 220, the corner cameras 222a-222d, and/or the side cameras 226a-226b. In an example, the radars 216 may comprise the corner radars 222a-222d, the forward looking radar 224, and/or the side radars 226a-226b.

In an example, the ECU 800 may be connected to a block (or circuit) 802. The circuit 802 may implement an electronic bus of the vehicle 50. The electronic bus 802 may be configured to transfer data between the ECU 800 and the vehicle platform of the vehicle 50, the HMI 202, the DMS 204, the IMS 206, the IMU 208, the HD map receiver 210, the GNSS receiver 212, the cameras 214 (e.g., the forward looking camera (FLC) 220) and corner viewing, side viewing and/or rear viewing cameras), the radars 216 (e.g., corner/side radar sensors 222a-222n, the forward looking radar (FLR) sensor 224, etc.), and the wireless communication transceiver 218. In some embodiments, the electronic bus 802 may be implemented as a vehicle Controller Area Network (CAN) bus. The electronic bus 802 may be implemented as an electronic wired network and/or a wireless network (e.g., Wi-Fi, BLUETOOTH, ZIGBEE, etc.). Generally, the electronic bus 802 may connect one or more components of the vehicle 50 to enable a sharing of information in the form of digital signals (e.g., a serial bus, an electronic bus connected by wiring and/or interfaces, a wireless interface, etc.).

The ECU 800 generally comprises a block (or circuit) 820, a block (or circuit) 822, and a block (or circuit) 824. The circuit 820 may implement a processor. The circuit 822 may implement a communication port. The circuit 824 may implement a memory. Other blocks (not shown) may be implemented (e.g., filters, clocks/timers, I/O ports, power connectors, interfaces, etc.). The number and/or types of circuits implemented by the module 800 may be varied according to the design criteria of a particular implementation.

The processor 820 may be implemented as a microcontroller, a multi-thread microprocessor, or any combination thereof. The processor 820 may comprise a block (or circuit) 850 implementing an in-cabin monitoring module, a block (or circuit) 852 implementing a system update module, a block (or circuit) 854 implementing an item tracking module, and/or a block (or circuit) 856 implementing a point-of-sale module. The processor 820 may comprise other components such as a map module, a GNSS module, a filter, and a clock (not shown).

In some embodiments, the processor 820 may be a combined (e.g., integrated) chipset implementing processing functionality. In some embodiments, the processor 820 may be comprised of a number of separate circuits (e.g., a microcontroller, a multi-thread microprocessor, a digital signal processor (DSP), a graphics processing unit (GPU), etc.). The design of the processor 820 and/or the functionality of various components of the processor 820 may be varied according to the design criteria of a particular implementation. The processor 820 is shown sending data to and/or receiving data from the vehicle platform of the vehicle 50, the communication port 822, and/or the memory 824. However, the processor 820 may be configured to implement additional data and/or control paths to meet design criteria of a particular application.

In an example, the memory 824 may comprise a block (or circuit) 860 and a block (or circuit) 862. The block 860 may store data utilized by the processor 820 in implementing the item identification and registration techniques in accordance with embodiments of the invention. The block 862 may store computer readable instructions (e.g., instructions readable by the processor 820). In an example, the data 860 may store various data sets 870a-870n. In an example, the data set

870*a* may be utilized by the processor 820 to provide guidance during installation of a certified (or registered) product. For example, the data set 870*a* may comprise an installation manual, video, or other guidance that may be displayed, for example, by the HMI 202. In an example, the data set 870*b* may store information enabling the processor to identify and track objects in the cabin of the vehicle 50 (e.g. using the IMS 206). In an example, the data set 870*c* may be utilized by the processor 820 to store an inventory of registered items. In an example, the data set 870*d* may be utilized by the processor 820 to store feedback data (e.g., images, statistics, etc.) to be sent to manufactures and/or suppliers. The memory 824 may also be configured to store other data sets 870*n* (e.g., environmental data, etc.).

In an example, the other data sets 870*n* may comprise parameters (e.g., coefficients) and/or calibration data used to transform data received from the various sensors (e.g., FLC, FLR, FCR, FCS, IMS, IMU, etc.) of the vehicle. In an example, the calibration data 870*n* may provide many sets of coefficients (e.g., one set of coefficients for each of the sensors). The calibration data 870*n* may be updatable. For example, the calibration data 870*n* may store current values as coefficients for the sensors and, as the data from the sensors drifts, the module 800 may update the calibration data 870*n* in order to maintain accuracy. The format of the calibration data 870*n* may vary based on the design criteria of a particular implementation. Various other types of data may be stored in the data set 870*n* as part of the data 860. In an example, the other data 870*n* may store past data values of the calibration data and/or current data values of the calibration data. The past and current data values of the calibration data may be compared to determine trends used to extrapolate and/or predict potential future values for the calibration data.

The processor 820 may be configured to execute stored computer readable instructions (e.g., the instructions 862 stored in the memory 824). The processor 820 may perform one or more steps based on the stored instructions 862. In an example, steps of the instructions 862 may be executed/performed by the processor 820 and may implement one or more of the in-cabin monitoring module 850, the system updating module 852, the item tracking module 854, and the point-of-sale module 856. The instructions executed and/or the order of the instructions 862 performed by the processor 820 may be varied according to the design criteria of a particular implementation.

The communication port 822 may allow the module 800 to communicate with external devices such as the vehicle platform of the vehicle 50, the human machine interface 202, the driver monitoring system 204, the in-cabin monitoring system 206, etc. For example, the module 800 is shown connected to the external electronic bus 802. In an example, information from the module 800 may be communicated to an infotainment device for display and/or presentation to a driver or occupant. In another example, a wireless connection (e.g., Wi-Fi, BLUETOOTH, cellular, etc.) to a portable computing device (e.g., a smartphone, a tablet computer, a notebook computer, a smart watch, etc.) may allow information from the module 800 to be displayed and/or otherwise communicated (e.g., aurally, etc.) to a user. In another example, the wireless connection may be used to download item information from a remote database.

In some embodiments, the ECU 800 may further comprise a filter and a clock. The filter may be configured to perform a linear quadratic estimation. For example, the filter may implement a Kalman filter. Generally, the filter may operate recursively on input data to produce a statistically optimal estimate. For example, the filter may be used to calculate the position coordinates and/or estimate the accuracy of the position coordinates utilized by the GNSS module 850 and the map module 852. In some embodiments, the filter may be implemented as a separate module. In some embodiments, the filter may be implemented as part of the memory 824 (e.g., the stored instructions 862). The implementation of the filter may be varied according to the design criteria of a particular implementation. The clock may be configured to determine and/or track a time. The time determined by the clock may be stored as a time stamp in the other data 870*n*. In some embodiments, the clock may be configured to compare time stamps received from the GNSS receiver 212.

The module 800 may be configured as a chipset, a system on chip (SoC) and/or a discrete device. For example, the module 800 may be implemented as an electronic control unit (ECU). In some embodiments, the module 800 may be configured to control activation of one or more ADAS features/functions.

The possibility to register items (car seats, booster seats, etc.) to a vehicle may allow the interior sensors to identify and track the items to improve detection for interior sensors. Suppliers of interior sensors may license the database of items to automatically update the software in the vehicle to identify the items.

Item suppliers may register items via a process and upload their product data to a database for updates to vehicle sensors. For example, a car seat supplier may follow a process to register their product into the database. The car seat supplier may then apply a notification on the packaging to indicate the car seat is registered to the database. When the buyer of the car seat activates the vehicle process (e.g., via the vehicle HMI or some other method) and shows the notification or identification mark (e.g., QR code, barcode, etc.) to a vehicle sensor (e.g., driver monitoring system, forward looking camera, radar, etc.), the system may either update the system to support the seat or download a profile of the seat to the system. This would avoid machine learning (or CNN) of all seat models and the product may be automatically added to the software of the sensor suite for a feature like car seat detection, child detection, etc.

In an example, the database may be approved by safety organizations (e.g., NCAP, NHSTA, etc.) and allow item suppliers to obtain an extra safety rating on their product. The sensor suppliers register for the database and may also apply the rating to their sensor as being compatible with the database. The database owner may supply the process for adding a product to the database and allow for download of item data to a sensor database of the vehicle. Item data may be updated to the cloud to allow feedback to all parties involved. In an example, an in-vehicle gateway may be used to upload meta data to the cloud. In an example, feedback may be provided to child seat suppliers regarding use of the product, duration of use, whether the seat has been in an accident (e.g., CARFAX for child seats), etc. Embodiments may be extended to any products used in vehicles. Captured item image data from vehicles may be used by manufacturers and/or suppliers for training data. In some embodiments, the concept may be extended to purchasable items used in robo-taxis or any shared vehicles (e.g., Uber, Lyft, etc.). In an example, users whose profiles are registered may purchase products in a vehicle and add the payment to a user account. In an example, a user may type a password into the infotainment screen to log into an account, show an item (e.g., a bottle of water, etc.) to a vehicle sensor, and the cost may be applied automatically to the user account.

The database of items may be used by suppliers to aid in training of sensor systems that are registered in the vehicle. Item data may be collected and uploaded to the cloud, via the vehicle gateway (or other mechanism), and then utilized by sensor suppliers to aid in training of systems instead of data marking and analysis. The code method identifies the product and allows suppliers to not mark data and use data already marked, via the code method, for training their system.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
an image sensor configured to capture images of a field of view of said image sensor; and
a processor circuit configured to (i) receive said images captured by said image sensor and (ii) generate one or more control signals in response to objects in said images, wherein said processor circuit is further configured to (i) detect a registration indicia on an object in one or more of said images, (ii) determine whether said processor circuit includes support for said object associated with said registration indicia, and (iii) when said processor circuit does not include support for said object associated with said registration indicia, download support information for said object associated with said registration indicia from a database.

2. The apparatus according to claim 1, wherein said image sensor and said processor circuit are integrated with a vehicle.

3. The apparatus according to claim 2, wherein
said image sensor is integrated with a human machine interface of said vehicle; and
said processor circuit is configured to determine whether said processor circuit includes support for said object associated with said registration indicia and download support information for said object associated with said registration indicia from said database as part of an object identification and registration operation.

4. The apparatus according to claim 3, wherein said processor is further configured to initiate said object identification and registration operation in response to a command received from a user of said vehicle via said human machine interface.

5. The apparatus according to claim 3, wherein said processor is further configured to initiate said object identification and registration operation in response to receiving an image containing said registration indicia from said image sensor.

6. The apparatus according to claim 2, wherein said support information for said object associated with said registration indicia enables said processor circuit to detect said object in said vehicle using said image sensor under a plurality of conditions.

7. The apparatus according to claim 6, wherein said plurality of conditions include when said object is only partially visible in said images.

8. The apparatus according to claim 1, wherein said support information for said object associated with said registration indicia enables said processor circuit to perform a point of sale operation for said object.

9. The apparatus according to claim 8, wherein said processor circuit performs said point of sale operation for said object using at least one of a human machine interface of a vehicle and an infotainment system of said vehicle.

10. The apparatus according to claim 9, wherein said vehicle comprises at least one of a vehicle for hire and an autonomous vehicle.

11. A method of identifying an item in a vehicle comprising:
receiving images captured by an image sensor; and
generating one or more control signals using a processor circuit in response to objects in said images, wherein said processor circuit is configured to (i) detect a registration indicia on an object in one or more of said images, (ii) determine whether said processor circuit includes support for said object associated with said registration indicia, and (iii) when said processor circuit does not include support for said object associated with said registration indicia, download support information for said object associated with said registration indicia from a database.

12. The method according to claim 11, wherein said image sensor and said processor circuit are integrated with a vehicle.

13. The method according to claim 12, wherein
said image sensor is integrated with a human machine interface of said vehicle; and
said processor circuit is configured to determine whether said processor circuit includes support for said object associated with said registration indicia and download support information for said object associated with said registration indicia from said database as part of an object identification and registration operation.

14. The method according to claim 13, further comprising:
receiving a command from a user of said vehicle via said human machine interface; and
initiating said object identification and registration operation in response to said command.

15. The method according to claim 13, further comprising:
initiating said object identification and registration operation in response to receiving an image containing said registration indicia from said image sensor.

16. The method according to claim 11, wherein said support information for said object associated with said registration indicia enables said processor circuit to detect said object in said vehicle using said image sensor under a plurality of conditions.

17. The method according to claim 16, wherein said plurality of conditions include when said object is only partially visible in said images.

18. The method according to claim 11, wherein said support information for said object associated with said registration indicia enables said processor circuit to perform a point of sale operation for said object.

19. The method according to claim 18, wherein said processor circuit performs said point of sale operation for said object using at least one of a human machine interface of a vehicle and an infotainment system of said vehicle.

20. The method according to claim 19, wherein said vehicle comprises at least one of a vehicle for hire and an autonomous vehicle.

\* \* \* \* \*